US011962478B2

(12) United States Patent
Fendt et al.

(10) Patent No.: US 11,962,478 B2
(45) Date of Patent: Apr. 16, 2024

(54) FEASIBILITY CHECK FOR NETWORK SLICE INSTANTIATION

(71) Applicant: NOKIA TECHNOLOGIES OY, Espoo (FI)

(72) Inventors: Andrea Fendt, Dasing (DE); Borislava Gajic, Unterhaching (DE); Christian Mannweiler, Munich (DE); Lars Christoph Schmelz, Haar (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 316 days.

(21) Appl. No.: 17/599,881

(22) PCT Filed: Apr. 5, 2019

(86) PCT No.: PCT/EP2019/058688
§ 371 (c)(1),
(2) Date: Sep. 29, 2021

(87) PCT Pub. No.: WO2020/200479
PCT Pub. Date: Oct. 8, 2020

(65) Prior Publication Data
US 2022/0200874 A1 Jun. 23, 2022

(51) Int. Cl.
*H04L 41/5054* (2022.01)
*H04L 41/5006* (2022.01)
(Continued)

(52) U.S. Cl.
CPC ...... *H04L 41/5054* (2013.01); *H04L 41/5006* (2013.01); *H04L 41/5051* (2013.01); *H04W 28/16* (2013.01)

(58) Field of Classification Search
CPC ............ H04L 41/5054; H04L 41/5006; H04L 41/5051; H04W 28/16
See application file for complete search history.

(56) References Cited

U.S. PATENT DOCUMENTS

2018/0317133 A1 11/2018 Sciancalepore et al.
2019/0394655 A1* 12/2019 Rahman .............. H04L 41/5058
(Continued)

FOREIGN PATENT DOCUMENTS

CN 108282352 A 7/2018
EP 3 396 997 A1 10/2018
(Continued)

OTHER PUBLICATIONS

International Search Report and Written Opinion dated Jan. 3, 2020 corresponding to International Patent Application No. PCT/EP2019/058688.

(Continued)

*Primary Examiner* — Adam D Houston
(74) *Attorney, Agent, or Firm* — SQUIRE PATTON BOGGS (US) LLP

(57) ABSTRACT

It is provided a method, comprising qualitatively checking if an infrastructure provides all features required to fulfill a request to set up a network slice instance; quantitatively checking if an available capacity of the infrastructure is sufficient to fulfill the request to set up the network slice instance; inhibiting the quantitative checking if, according to the qualitative checking, the infrastructure does not provide all the features required to fulfill the request to set up the network slice instance.

13 Claims, 9 Drawing Sheets

(51) Int. Cl.
*H04L 41/5051* (2022.01)
*H04W 28/16* (2009.01)

(56) References Cited

U.S. PATENT DOCUMENTS

| | | | | |
|---|---|---|---|---|
| 2020/0021487 A1* | 1/2020 | Yao | ............ | H04L 41/40 |
| 2020/0044943 A1* | 2/2020 | Bor-Yaliniz | ........ | H04L 41/5009 |
| 2020/0267785 A1* | 8/2020 | Talebi Fard | ........ | H04W 40/248 |
| 2022/0230108 A1* | 7/2022 | Bollapragada | ......... | G06Q 10/06 |
| 2023/0189006 A1* | 6/2023 | Chou | .................... | H04W 16/10 370/328 |
| 2023/0261932 A1* | 8/2023 | Seetharaman | .......... | H04L 41/40 709/223 |

FOREIGN PATENT DOCUMENTS

| | | | | |
|---|---|---|---|---|
| WO | WO 2018/196706 A1 | 11/2018 | | |
| WO | WO-2020200479 A1 * | 10/2020 | ............. | H04L 41/40 |
| WO | WO-2023203523 A1 * | 10/2023 | ......... | H04L 41/0806 |
| WO | WO-2023203548 A1 * | 10/2023 | ......... | H04L 41/0806 |

OTHER PUBLICATIONS

Huawei, "Add potential solution for NSI related service performance measurement," 3GPP Draft; S5-171671, 3GPP TSG SA WG5 (Telecom Management) Meeting #112, Guilin, China, Mar. 20, 2017, XP051258915.

Huawei, "pCR TR 28.801 generic e2e customer service provision solution," 3GPP Draft, S5-171665, 3GPP TSG SA WG5 (Telecom Management) Meeting #112, Guilin, China, Mar. 20, 2017, XP051258910.

3GPP TR 28.801 V1.1.0 (Mar. 2017), Technical Report, 3rd Generation Partnership Project; Technical Specification Group Services and System Aspects; Telecommunication management; Study on management and orchestration of network slicing for next generation network (Release 14), Mar. 31, 2017, XP055527122.

3GPP TS 28.530 V1.2.1 (Jul. 2018), Technical Specification, 3rd Generation Partnership Project; Technical Specification Group Services and System Aspects; Telecommunication management; Management and orchestration of 5G networks; Concepts, use cases and requirements (Release 15), Jul. 2018.

3GPP TS 28.531 V1.2.1 (Jul. 2018), Technical Specification, 3rd Generation Partnership Project; Technical Specification Group Services and System Aspects; Management and orchestration of 5G networks; Provisioning; (Release 15), Jul. 2018.

SA WG5, "New SID Study on Management aspects of communication services," 3GPP SP-180923, 3GPP TSG-SA Meeting #81, Gold Coast, Australia, Sep. 12-14, 2018.

Markus Fiedler, "On Resource Sharing and Careful Overbooking for Network Virtualization," IEEE, 20th ITC Specialist Seminar, May 18-20, 2009, Hoi An, Vietnam, May 2009.

Andrea Fendt et al., "A Formal Optimization Model for 5G Mobile Network Slice Resource Allocation," in IEEE IEMCON, Vancouver, 2018.

Tri Trinh et al., "Quality of Service Using Careful Overbooking for Optimal Virtual Network Resource Allocation," in The 8th Electrical Engineering/ Electronics, Computer, Telecommunications and Information Technology (ECTI) Association of Thailand, Conference 2011.

Andrea Fendt et al., "A Network Slice Resource Allocation Process in 5G Mobile Networks," in Innovative Mobile and Internet Services in Ubiquitous Computing, vol. 773, 2019, pp. 695-704.

Jianming Liu et al., "Opportunistic Link Overbooking for Resource Efficiency Under Per-Flow Service Guarantee," IEEE Transactions on Communications, vol. 58, No. 6, pp. 1769-1781, Jun. 2010.

3GPP TS 28.533 V15.0.0 (Sep. 2018), Technical Specification, 3rd Generation Partnership Project; Technical Specification Group Services and System Aspects; Management and orchestration; Architecture framework (Release 15), Sep. 2018.

Robert Ball et al., "Aggressive Telecommunications Overbooking Ratios," in IEEE International Conference on Performance, Computing, and Communications, 2004, pp. 31-38.

Weisheng Xie et al., "Network Virtualization with Dynamic Resource Pooling and Trading Mechanism," in 2014 IEEE Global Communications Conference, Globecom 2014, pp. 1829-1835.

Zhaleh Sadreddini et al., "PSO-optimized Instant Overbooking Framework for Cognitive Radio Networks," in 2015 38th International Conference on Telecommunications and Signal Processing (TSP), 2015, pp. 49-53.

Andrea Fendt et al., "A Network Slice Resource Allocation and Optimization Model for End-to-End Mobile Networks," in IEEE 5G World Forum, Santa Clara, 2018.

First Office Action dated Feb. 7, 2024 corresponding to Chinese Patent Application No. 201980095063.0, with English summary thereof.

* cited by examiner

FEASIBILITY CHECK FOR NETWORK SLICE INSTANTIATION

FIELD OF THE INVENTION

The present invention relates to network slicing. In a particular case, it relates to checking whether or not it is feasible to set up a slice.

Abbreviations
3GPP 3$^{rd}$ Generation Partnership Project
3G/4G/5G 3$^{rd}$/4$^{th}$/5$^{th}$ Generation
e2e end-to-end
eMBB enhanced Mobile Broadband
ETSI European Telecommunications Standards Institute
EVR Evaluation Result
gNB gNodeB (base station of 5G)
GST Generic Network Slicing Template
HD High Definition
Id Identifier
IoT Internet of Things
LTE Long-term Evolution
MD Management Domain
mMTC massive Machine Type Communication
MS Mobile Station
NF Network Function
NSE Network Slice Embedding
NSI Network Slice Instance
NSI-D Network Slice Instance Description
NSI-FC Network Slice Instance Feasibility Checker
NSI-P Network Slice Instance Provider
NSI-R Network Slice Instance Request
NSL Network Slice
NSMS Network Slice Management Service
NSS Network Slice Subnet
NSSI Network Slice Subnet Instance
NSSMS Network Slice Subnet Management Service
PoF Probability of Feasibility
QoS Quality of Service
RAN Radio Access Network
SDO Standard Developing Organizations
SLA Service Level Agreement
SNR Signal to Noise Ratio
TS Technical Specification
UAV Unmanned Aerial Vehicle
UE User Equipment
URLLC Ultra Reliable and Low Latency Communication
VNE Virtual Network Embedding
ZSM Zero-touch Network and Service Management Reference Architecture

BACKGROUND OF THE INVENTION

The fifth generation of mobile networks (5G) covers a wide variety of novel use cases, such as the Internet of Things (IoT) and the Industry of the Future (Industry 4.0) requiring massive Machine Type Communication (mMTC). Furthermore, highly safety and security critical use cases like autonomous driving and vehicular communication, including e.g. Unmanned Aerial Vehicle (UAV) control require Ultra-Reliable and Low Latency Communication (URLLC). But also, traditional enhanced Mobile Broadband (eMBB) applications like HD video streaming and augmented reality must be considered. These diverse use cases enforce different requirements on mobile networks. Network slicing is seen as a key concept of future 5G mobile networks to make the networks flexible enough to support those divergent requirements by dissolving the traditional concept of one monolithic mobile network serving all purposes.

A Network Slice Instance (NSI) is an isolated end-to-end logical network containing all required physical and virtualized resources and network functions to fulfill specific service requirements based on Service Level Agreements (SLAs). Usually several NSIs share the same physical and virtualized infrastructure. A Network Slice Instance may be composed of several Network Slice Subnet Instances (NSSI).

3GPP TS 28.530 [1] defines the baseline of NSI management and orchestration. It provides the description of the NSI lifecycle, the roles of the involved management entities as well as the description of several use cases. The NSI provisioning is described as one of the fundamental use cases. MDs contain (and manage) physical and virtualized network resources (the "substrate") that are used to form (instantiate) NSSIs that are in turn contained in one (or multiple) NSIs.

Within the provisioning procedure, the 3GPP management system assesses the feasibility of the requested, additional NSI by checking the inventory and the required NSI constituents. According to the results of the check, the required resources are reserved. Further details on the provisioning process of an NSI are standardized in 3GPP TS 28.531 [2]. On an abstract level, [2] describes the use case of the NSI and Network Slice Subnet Instance (NSSI) feasibility check. The actual feasibility check is performed at the NSSI level. It provides a feedback on whether or not the requirements can be fulfilled based on information regarding, for instance, the available network resources, load level and inputs from data analytics. This procedure is triggered upon the reception of a request to reserve certain resources for an NSI, cf. FIG. 1.

This application makes reference to the high-level ETSI ZSM reference architecture [3]. The main parts of the architecture are the e2e Service Management Domain and the Management Domains. The e2e Service Management Domain manages an end-to-end service using one or several Management Domains. Individual Management Domains expose a subset of their management services, e.g., the control and orchestration of domain-specific physical and virtualized network resources, to the Inter-domain Integration Fabric so that authorized entities from other domains can consume them.

ETSI GS ZSM 002 V0.8.0 standard [3] also defines a high-level feasibility check, which is part of the domain orchestration services. It checks whether or not a specific part of a parameterized end-to-end service can be deployed without violating its SLA.

5G mobile networks shall support a variety of new use cases that might have very diverse and dynamically changing requirements related to, for instance, throughput, latency, availability and reliability. Particularly, the 5G mobile networks are required to support much faster mobile communication service roll out and deployment times. The configuration and implementation of a new communication services (and according NSIs) shall be realized within minutes, instead of months as in legacy deployments.

Such stringent requirements in terms of service creation times require fast and automatic execution of the NSI provisioning and feasibility checking. However, querying the different subnets in order to acquire the current, up-to-date information about available and allocated resources in order to decide on the NSI feasibility might be a complex and time-consuming process. This is particularly critical if such a query needs to be done across different administrative management domains, e.g. if the NSI is composed of several NSSIs owned by different NSSI providers.

However, there are currently no means available that allow for a very fast feasibility checking if setting up an additional NSI is requested. In particular, without detailed queries to the NSSI providers, there are no means to provide an estimation whether or not an NSI and the associated communication service(s) can be deployed on an existing network infrastructure such that the SLAs of the additional NSI as well as the SLAs of the already running NSIs are fulfilled.

A nearly optimal NSI embedding algorithm has been published for a particular case (NSI embedding with full knowledge about the resource availability and requirements) in [5] and [6], based on some fundamental work presented in [4].

In the area of industrial standards, there is a high-level description of feasibility check within one specific Management Domain (MD) (SA5 telecom management, cf. [2]) as well as a placeholder for an MD-specific "Feasibility check service" in ZSM, cf. [3]. However, no Standard Developing Organisation (SDO) currently investigates time-constrained cross-domain, end-to-end communication service feasibility check.

In academic literature, several promising approaches on assignment and overbooking of (virtual) network resources have been published during the recent years. None of the academic concepts considers providing a confidence in resource availability and the risk of SLA violation for fixed service level agreements in mobile end-to-end (e2e) networks, including for instance the RAN, fixed networks and cloud servers. In [7], the authors show that careful network overbooking can save costs for the user, while concurrently increasing the revenue of the network service provider, from a game theoretical point of view. Like most publications on network overbooking, it only focuses on the overbooking of a single resource, without considering potentially interdependent other resources. That means, they do not have a comprehensive view on the virtual network embedding and overbooking problem.

An exception, regarding the consideration of virtual network embedding aspects, is the work of Trinh et al. proposing an overbooking mechanism for logical networks in [8]. Their work is based on soft-guaranteed service levels, providing only a percentage of time with full e.g. bandwidth or service availability and a reduction factor for the limited availability. However, the focus of this work is to calculate which price reduction per user can be offered, if the customer accepts a predefined limited service availability for a single resource, like bandwidth. It also does not consider the expected resource utilization as well as the expected resource provisioning of a realistic e2e mobile network.

Fiedler [9] provides an approach for careful virtual network overbooking, focusing on the availability of one resource shared by several users. It is also based on a per user embedding, based upon an artificial traffic model, which cannot be directly transferred on NSI embedding in e2e mobile networks. It also does not include an optimization of resource allocation.

Several publications, for instance, Ball et al. [10] and Liu et al. [11] propose an optimal communication link-overbooking ratio calculation for telecommunication networks maintaining a predefine Quality of Service (QoS) level. Sadreddini et al. [12] propose a Framework for Cognitive Radio network to find the optimal compensation rate for network overbooking using Particle Swarm Optimization. These works are in control of the number and size of incoming NSI requests.

REFERENCES

[1] 3GPP 28.530, "Management and orchestration of 5G networks: Concepts, use cases and requirements", Release 15, V1.2.1 (2018-07)
[2] 3GPP 28.531, "Management and orchestration of 5G networks; Provisioning" Release 15, V1.2.1 (2018-07)
[3] DRAFT ETSI GS ZSM, "Reference Architecture" 002, V0.8.0 (2018-12)
[4] A. Fendt, L. C. Schmelz, W. Wajda, S. Lohmuller, and B. Bauer, "A Network Slice Resource Allocation Process in 5G Mobile Networks" in Innovative Mobile and Internet Services in Ubiquitous Computing, vol. 773, L. Barolli, F. Xhafa, N. Javaid, and T. Enokido, Eds. Cham: Springer International Publishing, 2019, pp. 695-704.
[5] A. Fendt, S. Lohmuller, L. C. Schmelz, and B. Bauer, "A Network Slice Resource Allocation and Optimization Model for End-to-End Mobile Networks" in IEEE 5G World Forum, Santa Clara, 2018.
[6] A. Fendt, C. Mannweiler, L. C. Schmelz, and B. Bauer, "A Formal Optimization Model for 5G Mobile Network Slice Resource Allocation" in IEEE IEMCON, Vancouver, 2018.
[7] W. Xie, J. Zhu, C. Huang, M. Luo, and W. Chou, "Network virtualization with dynamic resource pooling and trading mechanism," in 2014 IEEE Global Communications Conference, 2014, pp. 1829-1835.
[8] Tri Trinh et al., "Quality of service using careful overbooking for optimal virtual network resource allocation" in The 8th Electrical Engineering/Electronics, Computer, Telecommunications and Information Technology (ECTI) Association of Thailand—Conference 2011
[9] M. Fiedler, "On Resource Sharing and Careful Overbooking for Network Virtualization," 20th ITC Specialist Seminar, 18.-20. May 2009, Hoi An, Vietnam, May, 2009.
[10] R. Ball, M. Clement, F. Huang, Q. Snell, and C. Deccio, "Aggressive telecommunications overbooking ratios," in IEEE International Conference on Performance, Computing, and Communications, 2004, 2004, pp. 31-38.
[11] J. Liu, X. Jiang, and S. Horiguchi, "Opportunistic link overbooking for resource efficiency under per-flow service guarantee," IEEE Transactions on Communications, vol. 58, no. 6, pp. 1769-1781, June 2010.
[12] Z. Sadreddini, E. Güler, and T. çavdar, "PSO-optimized Instant Overbooking Framework for cognitive radio networks," in 2015 38th International Conference on Telecommunications and Signal Processing (TSP), 2015, pp. 49-53.
[13] ETSI TS 5G; Management and orchestration; Architecture framework, 3GPP TS 28.533 version 15.0.0 Release 15.
[14] GSM Association, GSMA Generic Network Slice Template, Version 0.1, Official Document OD Template.
[15] 3GPP, SP-180923, "Study on management aspects of communication services (FS_CSMAN)", Proposed New Study Item, September 2018.

SUMMARY OF THE INVENTION

It is an object of the present invention to improve the prior art.

According to a first aspect of the invention, there is provided an apparatus, comprising means for qualitatively checking configured to check qualitatively if an infrastructure provides all features required to fulfill a request to set up a network slice instance; means for quantitatively checking configured to check quantitatively if an available capacity of the infrastructure is sufficient to fulfill the request to set up the network slice instance; means for inhibiting configured to inhibit the means for quantitatively checking from the quantitative checking if, according to the qualitative checking, the infrastructure does not provide all the features required to fulfill the request to set up the network slice instance.

According to a second aspect of the invention, there is provided an apparatus, comprising means for quantitatively checking configured to check quantitatively if an available capacity of an infrastructure is sufficient to fulfill a request to set up a network slice instance and for calculating a confidence value of a result of the checking; means for providing configured to provide a confidence value specifying a confidence of the result of the quantitative checking.

According to a third aspect of the invention, there is provided an apparatus, comprising means for querying configured to query a network capacity of a network from the network; means for storing configured to store an indication of the network capacity received in response to the querying; means for monitoring configured to monitor if a request to provide an indication of the network capacity is received; means for responding configured to respond to the request by providing the stored indication of the network capacity if the request is received.

According to a fourth aspect of the invention, there is provided a method, comprising qualitatively checking if an infrastructure provides all features required to fulfill a request to set up a network slice instance; quantitatively checking if an available capacity of the infrastructure is sufficient to fulfill the request to set up the network slice instance; inhibiting the quantitative checking if, according to the qualitative checking, the infrastructure does not provide all the features required to fulfill the request to set up the network slice instance.

According to a fifth aspect of the invention, there is provided a method, comprising quantitatively checking if an available capacity of an infrastructure is sufficient to fulfill a request to set up a network slice instance; calculating a confidence value of a result of the checking; providing a confidence value specifying a confidence of the result of the quantitative checking.

According to a sixth aspect of the invention, there is provided a method, comprising querying a network capacity of a network from the network; storing an indication of the network capacity received in response to the querying; monitoring if a request to provide an indication of the network capacity is received; responding to the request by providing the stored indication of the network capacity if the request is received.

Each of the methods of the fourth to sixth aspects may be a method of feasibility checking.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some example embodiments of the invention, at least one of the following advantages may be achieved:
- Quick decisions whether or not a slice may be set up;
- Knowledge of the confidence in estimating if sufficient resources are available.

Further advantages become apparent from the following detailed description.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein:

FIG. 3 comprising

FIG. 5 comprising

DETAILED DESCRIPTION OF CERTAIN EXAMPLE EMBODIMENTS

Figure 1:
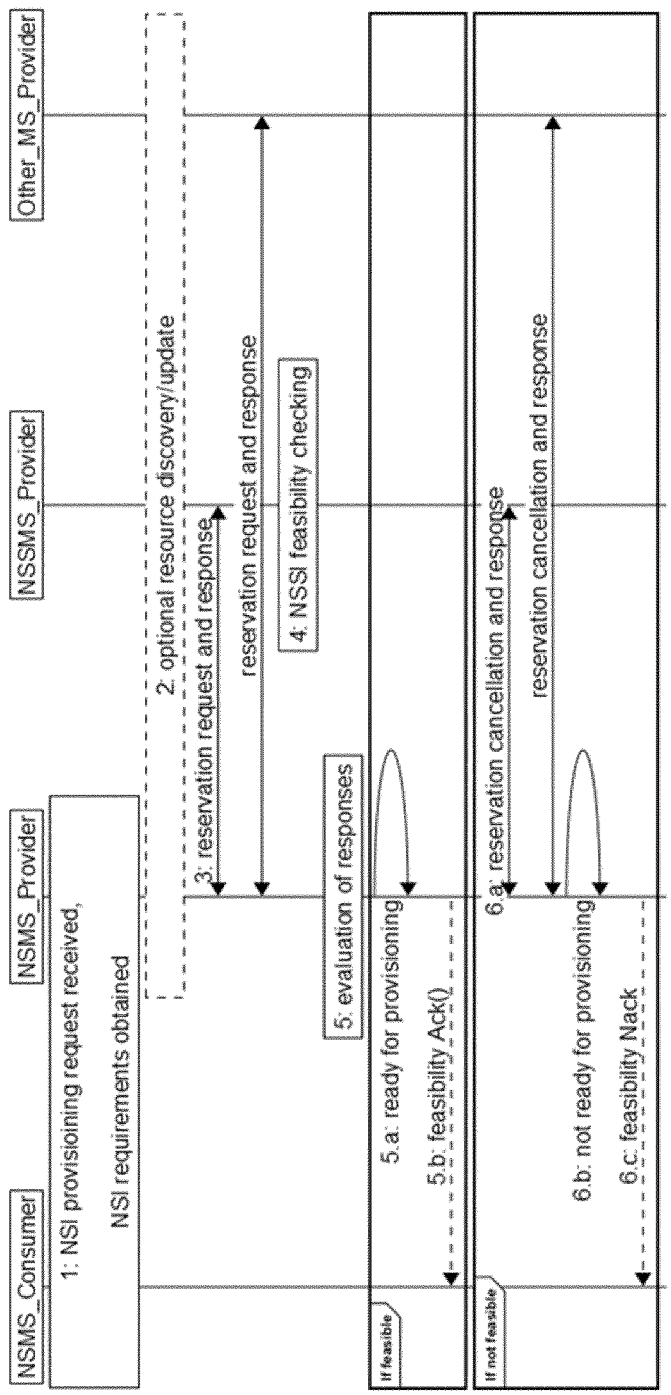
FIG. 1 shows a NSI feasibility check procedure according to [2]

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

In contrast to the high-level feasibility check according to ETSI GS ZSM 002 V0.8.0, some example embodiments of the invention are not bound to the Management Domains (also named orchestration domains), but perform the feasibility check in the End-to-End Service Management Domain. The feasibility check collects all required NSI resource and parameter data from the Management Domains and analyzes and aggregates them. This allows to make a deployment decision based on profound data, taking interrelation between NSSIs from several Management Domains and their composition to an NSI into account.

In contrast to the work in [5] and [6], some example embodiments of this invention tackle the NSI embedding problem under uncertainty. Furthermore, some example embodiments of this invention provide a novel architecture and apparatus for the NSI Feasibility Checking. Furthermore, some example embodiments provide a confidence of the provisioning. Some example embodiments of the invention estimate at least one of the expected resource utilization and the expected resource provisioning of a realistic e2e mobile network from historical data. Some example embodiments of the invention are not in control of the number and size of incoming NSI requests and aim to embed as many NSIs as reasonably possible, while allowing a careful overbooking of several partly interdependent resources, combined with numerous further qualitative and quantitative feasibility constraints. Furthermore, they may estimate the confidence in resource availability for a requested NSI in a network such as an e2e mobile network. This is to the best of our knowledge not addressed in academic literature and by any prior art yet.

Some example embodiments address the problem of performing a time-constrained, very fast feasibility check for a requested, additional NSI and constituent NSSIs, respectively. A decision on whether or not there are enough resources in the subnet domains shall be made automatically within only a few minutes. Idle resources can then be used to deploy an additional NSSI or modify and reuse existing NSSIs.

This decision must respect the SLAs and the QoS requirements of the already operational NSI(s) and the additional NSI(s). The desired short response time does not allow for querying the different potential NSSI providers for their current resource availability. In addition to that, the future resource availability is uncertain, especially for the RAN NSSIs.

Therefore, accurate predictions on the future resource availability and QoS parameters are required to be able to decide on the feasibility of deploying an additional NSI(s). Furthermore, some example embodiments of this invention provide confidence values for the resource availability and (based on that) the risk of SLA violation for the new, additional NSI(s).

Figure 2:
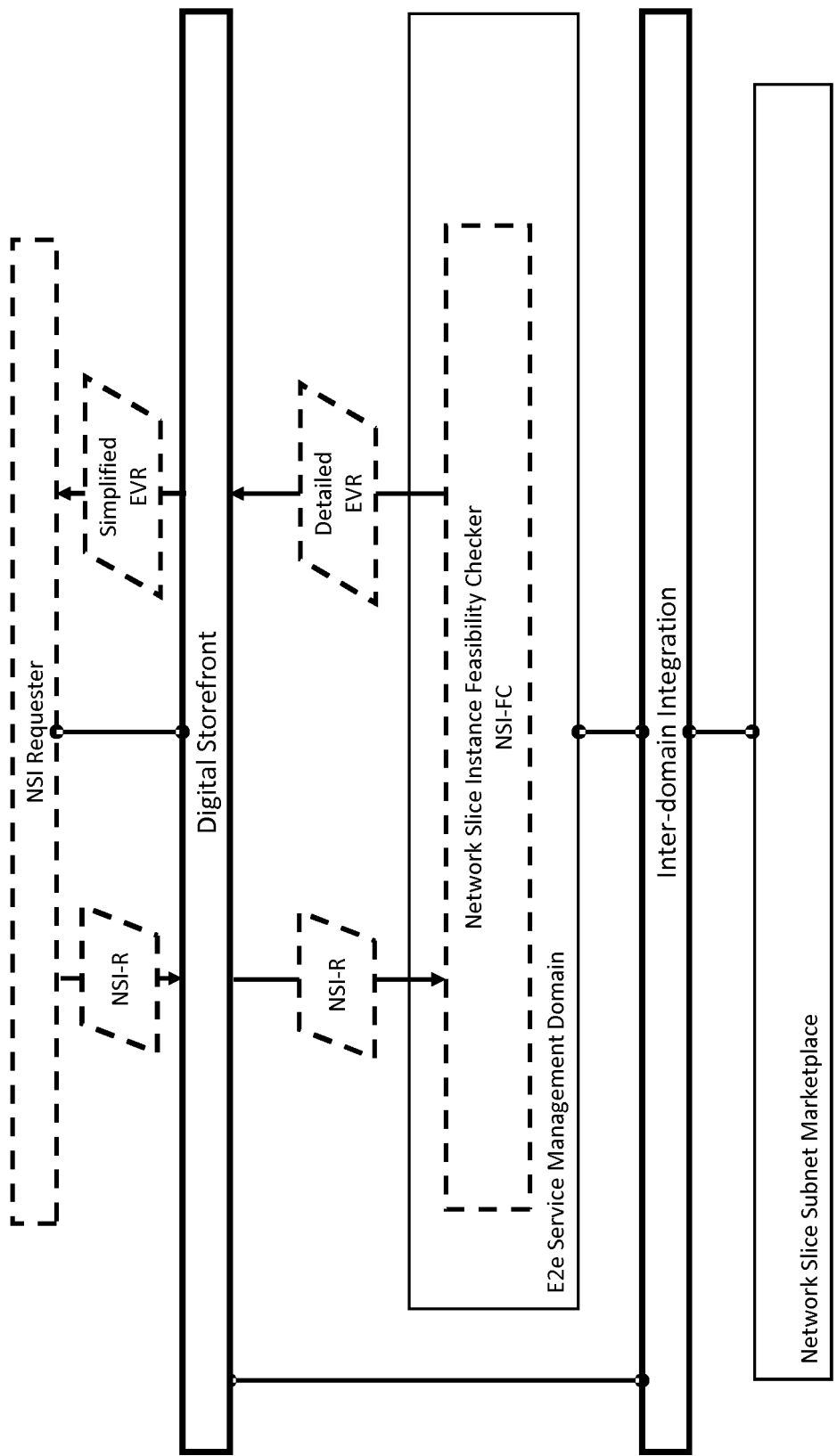
FIG. 2 shows components and interfaces of NSI-FC according to some example embodiments of the invention.
Figure 3A:
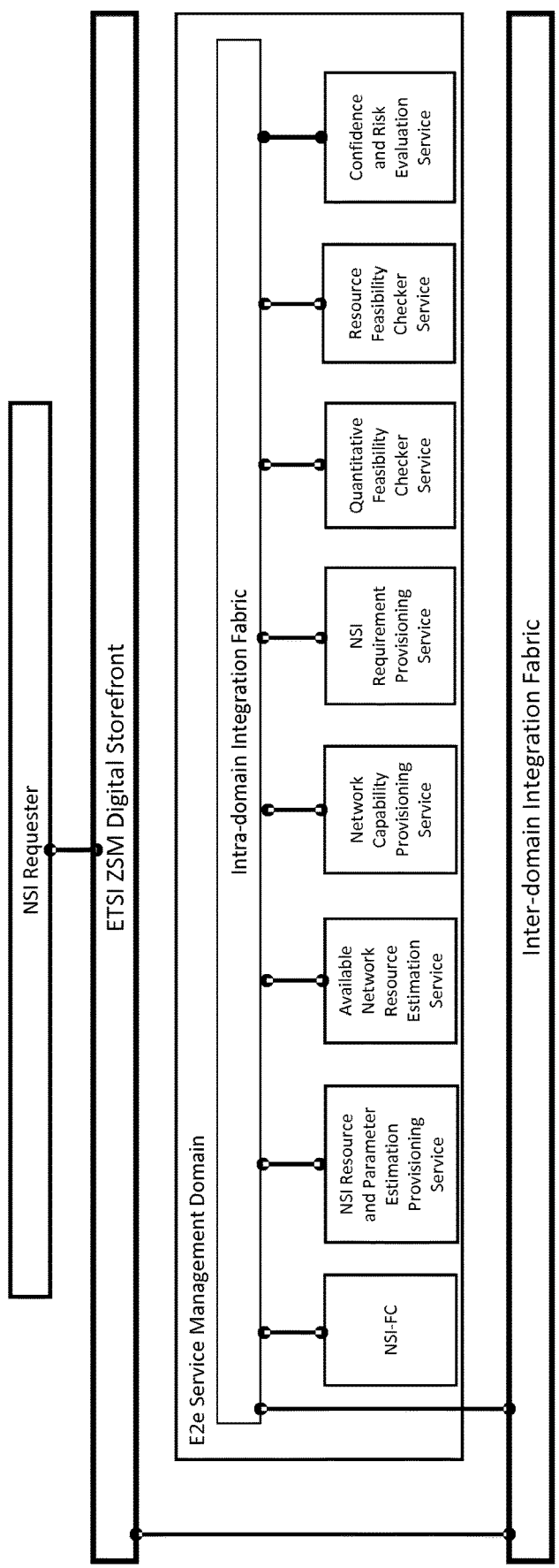
FIGS. 3A and 3B shows NSI-FC and its services according to some example embodiments of the invention and how NSI-FC is embedded within the ETSI ZSM architecture framework.
Figure 3A:
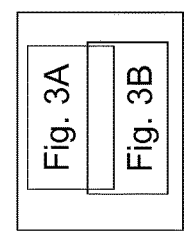
Figure 3B:
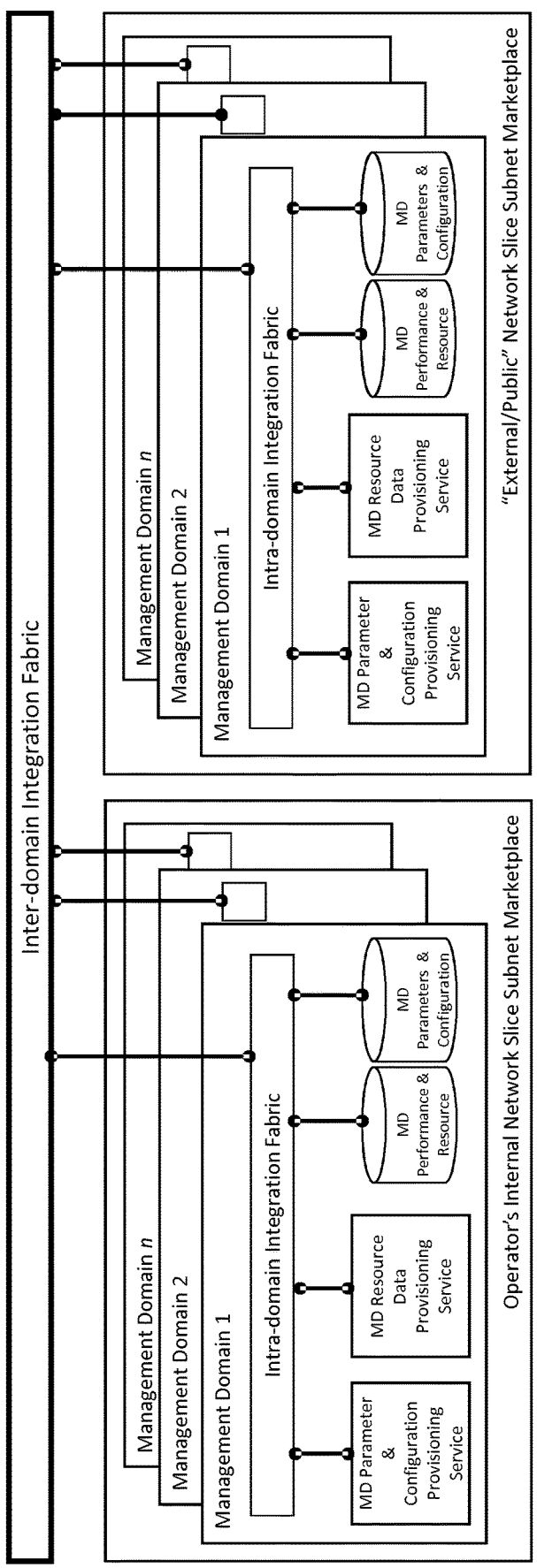
Figure 3B:
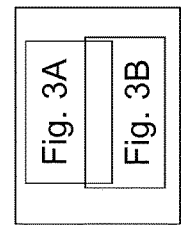

The NSI Feasibility Checker (NSI-FC) of some example embodiments of this invention may be embedded in the multi-domain network and service management reference framework of ETSI ZSM, which defines, among others, an e2e service management domain and several domain management areas targeting at, e.g., specific network or technology domains [3]. The NSI Feasibility Checker (NSI-FC) is a composition of several NSI admission services in the e2e Service Management Domain (see FIG. 2). Some example embodiments of this invention are identified by dashed lines in FIG. 2, continuous lines in FIG. 2 show their context within the ETSI ZSM framework. At a higher level of abstraction, the NSI-FC includes two major procedures, the qualitative feasibility check and a resource feasibility check (quantitative feasibility check). While the qualitative feasibility check verifies for instance the available technologies and network parameter configurations, the resource feasibility check is responsible for evaluating the resource volume availability in the MDs.

Some example embodiments of the invention work as follows: A Network Slice Instance Request (NSI-R) is submitted via the Customer Portal of the Digital Storefront, where the Network Slice Instance Provider (NSI-P) may have a chance to review and potentially adapt the NSI-R in cooperation with the NSI Requester. Usually, the role of the NSI-P will be carried out by the Mobile Network Operator. Then, the final NSI-R is passed on to the NSI-FC service that is exposed by the e2e Service Management Domain.

The NSI-FC takes the NSI-R as input. For each MD, it derives the MD-specific resource, features and configuration parameters for the respective required NSSI and compares them with the current resource utilization and the network performance status information provided by the respective MDs from the marketplace. Combining the information from each MD, the NSI-FC computes a detailed Evaluation Result (EVR) and returns a simplified EVR to the NSI Requester.

The Detailed Evaluation Result (EVR) contains detailed information on the feasibility of deploying the requested, additional NSI in a collection of the available MDs offered in the Network Slice Subnet Marketplaces (both internal and external ones). It may contain information on potential resource overbookings and/or confidences (in form of the probability) in the availability of the required resources and services. It may contain a confidence value of being able to fulfil the resource and QoS requirements for the NSI-R. The confidence level may be available at different granularity levels, for instance on QoS parameter, resource, and network element level. Based on the Detailed EVR, the NSI-P decides on the acceptance of the NSI-R and submits the detailed EVR or (preferably) a Simplified EVR to the NSI Requester. The Simplified EVR may only contain reduced (e.g., aggregated) information about the feasibility of the NSI-R.

The overall architecture of the NSI Feasibility Checker (NSI-FC) may be aligned with the ETSI ZSM reference architectures [3].

As shown in FIG. 3, each MD exposes services for parameters, configurations and resource data provisioning, the MD Parameter & Configuration Provisioning Service and the MD Resource Data Provisioning Service towards the Intra-domain Integration Fabric. Exemplary domains include RAN, Transport and Core Network. A subset of the services can also be exposed to the ETSI ZSM Inter-domain Integration Fabric. Administratively, the MDs may belong to the Network Operator (Operator's Internal Network Slice Subnet Marketplace) or to external organizations ("External/Public" Network Slice Subnet Marketplace).

Each MD manages one or several NSSIs and has its own Intra-domain Integration Fabric for Service registration, discovery, access control, and data exchange. Performance and resource availability data as well as the Parameters and Configuration of the MDs are separately stored in e.g. two (potentially dedicated) databases for each MD. As for the other MD services, the databases can be accessed via the "Intra-domain Integration Fabric" and may also be partially exposed to the Inter-domain Integration Fabric.

Figure 4:
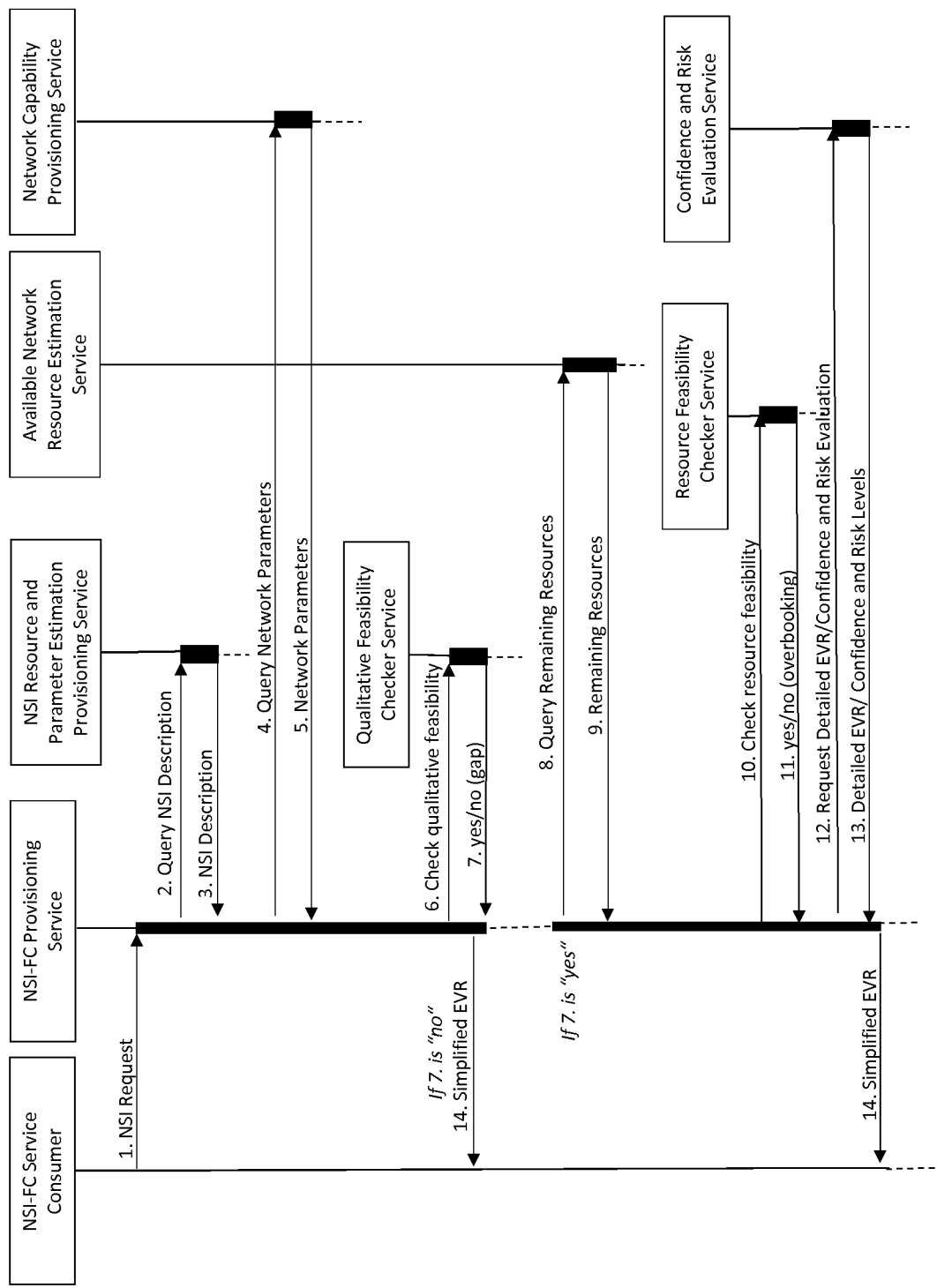
FIG. 4 shows a message flow according to some example embodiments of the invention.

The e2e Service Management Domain, which is (amongst other) responsible for the NSI Lifecycle Management, includes the NSI-FC according to some example embodiments of the invention (a flowchart explaining its function according to some example embodiments of the invention is depicted in FIG. 4). The NSI-FC is called after an NSI-R has been received via the ETSI ZSM Digital Storefront. The NSI-FC may manage the whole NSI embedding and feasibility check procedure by calling the other processes of the E2e Service Management Domain and requesting the required data from the services and databases in the MDs via the Inter-domain Integration Fabric.

Note that the Inter-domain Integration Fabric as well as the ETSI ZSM Digital Storefront are a set of functions and interfaces defined in the ETSI ZSM reference architecture [2]. The ETSI ZSM Digital Storefront, the E2e Service Management domain and the individual MDs are augmented by the NSI-FC according to some example embodiments of this invention. Therefore, this invention can contribute to the ETSI ZSM standard and might also be applicable to the SA5 [13] service-based architecture in the mid-term future.

FIG. 4 shows the sequence diagram of the NSI request and feasibility check procedure according to some example embodiments of the invention. FIG. 5 depicts related sub-processes performed by the Available Network Resource Estimation Service. The Available Network Resource Estimation Service queries the Network Capability Provisioning Service as well as the NSI Requirement Provisioning Service on a regular basis (e.g. periodically) to be able to quickly provide current network resource estimations and predictions whenever an NSI-R arrives.

FIG. 4 shows a message flow for the communication between the services according to some example embodiments of the invention. Details on the interfaces and transferred data elements are provided in Tab. 1.

The message flow according to FIG. 4 is as follows:
1.) The NSI-FC Service Consumer (i.e. the NSI Requester) sends the NSI-R to the NSI-FC Provisioning Service.
2.) The NSI-FC Provisioning Service queries the Network Slice Instance Description (NSI-D) for the requested, additional NSI from the NSI Resource and Parameter Estimation Provisioning Service, providing the NSI-R of message 1.
3.) The NSI Resource and Parameter Estimation Provisioning Service responds with the NSI-D for the requested NSI to the NSI-FC Provisioning Service.
4.) The NSI-FC Provisioning Service queries the Network Parameters from the Network Capability Provisioning Service.
5.) The Network Capability Provisioning Service responds with the Network Parameters to the NSI-FC Provisioning Service.
6.) The NSI-FC Provisioning Service triggers the Qualitative Feasibility Checker Service, providing the NSI-D as well as the Network Parameters from messages 3 and 5, respectively.
7.) The Qualitative Feasibility Checker Services responds to the NSI-FC Provisioning Service with "yes" or "no" and potential identified gaps to NSI requirements. If the Qualitative Feasibility Checker Service answers "no" the process ends and the simplified EVR is returned to the NSI-FC Service Consumer (message 14), otherwise the NSI-FC Provisioning Service continues with the quantitative resource evaluation.
8.) If the Qualitative Feasibility Checker Services responds with "yes", NSI-FC Provisioning Service queries the Remaining Resources from the Available Network Resource Estimation Service.
9.) The Available Network Resource Estimation Service reports the Remaining Resources to the NSI-FC Provisioning Service.
10.) The NSI-FC Provisioning Service triggers the Resource Feasibility Checker Service, providing the Remaining Resources of message 9.
11.) The Resource Feasibility Checker Service responds to the NSI-FC Provisioning Service with "yes" or "no" and a list of potential overbookings per resource category.
12.) The NSI-FC Provisioning Service triggers the Confidence and Risk Evaluation Service, providing the Remaining Resources of message 9 and the Overbooking Results of message 11.
13.) Depending on its implementation, the Confidence and Risk Evaluation Service responds to the NSI-FC Provisioning Service with a Detailed EVR or only the Confidence and Risk Levels.
14.) The NSI-FC Provisioning Service prepares a simplified EVR based on the detailed EVR (or Confidence and Risk Levels, respectively) and/or on the Remaining Resources of message 9 and the Overbooking Results of message 11 and provides the same to the NSI-FC Service Consumer, in this case the NSI Requester.

Figure 5B:
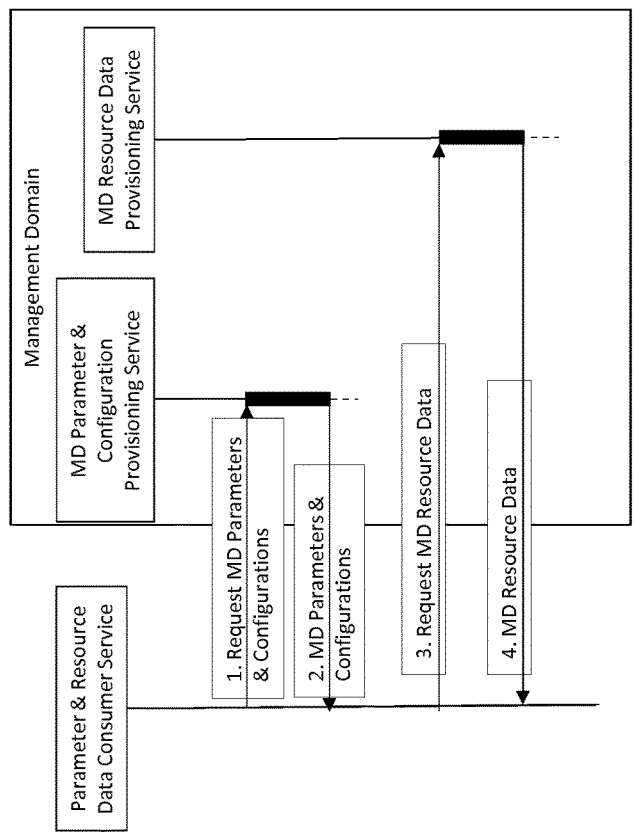
FIGS. 5A and 5B shows message flows according to some example embodiments of the invention.
Figure 5A:
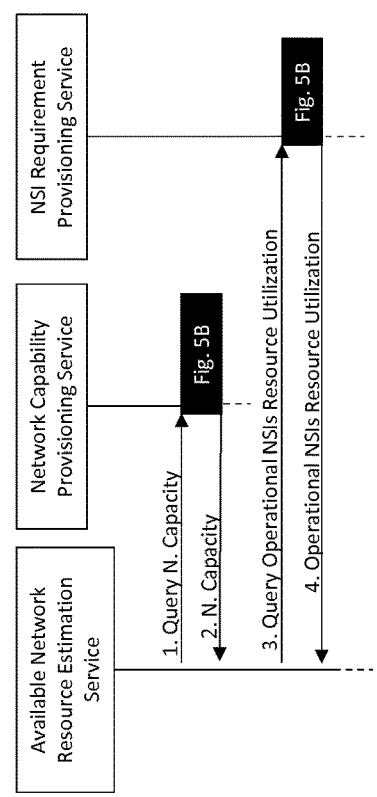

FIG. 5A shows a message flow according to some example embodiments of the invention. Details on the interfaces and transferred data elements are provided in Tab. 1. The Available Network Resource Estimation Service may query the Network Capability Provisioning Service and the NSI Requirement Provisioning Service on a regular basis (e.g. periodically), i.e. independent from a query received from the NSI-FC Provisioning Service (message 8 in FIG. 4).

FIG. 5A sows a single set of messages which may be repeated on a regular basis. The messages in FIG. 5A are as follows:
1.) The Available Network Resource Estimation Service queries the (overall) Network Capacity from the Network Capability Provisioning Service,
2.) The Network Capability Provisioning Service provides the Network Capacity Data to the Available Network Resource Estimation Service.
3.) The Available Network Resource Estimation Service queries the Operational NSIs Resource Utilization from the NSI Requirement Provisioning Service.
4.) The NSI Requirement Provisioning Service answers to the Available Network Resource Estimation Service with the Operational NSIs Resource Utilization (also named utilized network capacity).

Due to the regular querying, the Available Network Resource Estimation Service is aware of the overall network capacity and the utilized network capacity when it receives a query (message 8 of FIG. 4) from NSI-FC Provisioning Service. Thus, the Available Network Resource Estimation Service can provide quickly an answer to the query from NSI-FC Provisioning Service. The answer may be not fully up-to-date, depending on the events having occurred after the last query to Network Capability Provisioning Service and Available Network Resource Estimation Service. However, typically, it is assumed that the answer is sufficiently accurate.

In some example embodiments of the invention, the Available Network Resource Estimation Service queries the Network Capability Provisioning Service and Available Network Resource Estimation Service with different periodicities, or may not query one of these services at all. For example, it may assume that the overall network capacity is constant and, thus, may not query the Network Capability Provisioning Service.

The Network Capability Provisioning Service and Available Network Resource Estimation Service (jointly named Parameter & Resource Data Consumer Service) receives the requested capacity indications from the management domains. The corresponding message flow is shown in FIG. 5B.

1.) The Parameter & Resource Data Consumer Service (i.e., the Network Capability Provisioning Service or the NSI Requirement Provisioning Service) requests the MD Parameters & Configurations from all applicable MDs.

2.) For each queried MD, the MD Parameter & Configuration Provisioning Service responds to the Parameter & Resource Data Consumer Service with the MD Parameters & Configurations, cf. Table 1.

3.) The Parameter & Resource Data Consumer Service (i.e. the Network Capability Provisioning Service or the NSI Requirement Provisioning Service) requests the MD Resource Data from all applicable MDs.

4.) The MD Resource Data Provisioning Service responds to the Parameter & Resource Data Consumer Service with the MD Resource Data, cf. Table 1.

TABLE 1 comprises an In- and Output description of the NSI-FC according to some example embodiments of the invention.

| Input/Output | Description |
| --- | --- |
| Network Slice Instance Request (NSI-R) | Contains Typical SLA parameters:<br>latency<br>coverage<br>bandwidth (traffic profile)<br>performance reliability<br>mobility<br>. . .<br>Additional parameters are defined in the GSMA GST (Generic Network Slicing Template) [14]. |
| Network Slice Instance Description (NSI-D) | A technical description of the NSI-R, based on GSMA GST [14]. Specifies all requirements regarding resource and network capabilities.<br>Typical Parameters:<br>latency<br>throughput<br>computational power<br>memory capacities<br>availability<br>reliability<br>. . . |
| Network Parameter | Selected features and configuration parameters of the Network Slice Subnet (NSS) domains.<br>e.g.:<br>RAN technology<br>coverage<br>edge cloud availability<br>security features (like access control, encryption)<br>service and session continuity (e.g. seamless handover)<br>. . . |
| Qualitative Feasibility Answer | "yes"/"no"<br>and the gap to feasibility regarding the Network Parameters. |
| Network Capacity | A technical description of the overall capacity of the network (combining the idle NSSs) as well as the network capabilities, features and a probabilistic model of the resource availability for all consumable resources that are part of the NSI-D. |
| Network Slice Instances Resource Utilization | A probabilistic model of resource utilization (for instance a probability distribution) for all consumable resources of the NSI-D. |
| Remaining Resources | A probabilistic model of the remaining capacity (for each consumable resource in the NSI-D) for the overall network combining the idle NSSs, when all operational NSIs are considered. |
| Resource Feasibility Answer | "yes"/"no"<br>Potential overbooking: for each consumable resource in the NSI-D, the absolute value of expected overbooking, as well as a probabilistic model for each (overbooked) resource. |
| Detailed Evaluation Result (EVR) | Feasibility: "yes"/"no"<br>Plus, the overall confidence in SLA fulfilment/the overall risk of SLA violation. |
| Confidence and Risk Levels | For each resource: the absolute value of expected overbooking, as well as a probabilistic model for each overbooked resource. The confidence level is available at different granularity levels, for instance on QoS parameter, resource, and network element level. |

TABLE 1-continued comprises an In- and Output description of the NSI-FC
according to some example embodiments of the invention.

| Input/Output | Description |
|---|---|
| Simplified EVR | Feasibility: "yes"/"no" and other selected excerpts of the Detailed EVR |
| MD Parameter & Configurations | Parameters and configuration of operational NSSIs as well as the configuration possibilities of the overall MD. Typical parameters are: RAN technology coverage edge cloud availability security features (like access control, encryption) service and session continuity (e.g. seamless handover) maximum number of UEs coverage area latency UE mobility level resource sharing level Additional parameters are/will be defined in the 3GPP 28.541 Standard (see section 6.3.3 Service Profile and 6.3.4 Slice Profile). |
| MD Resource Data | The resource allocation and utilization of the operational NSSIs as well as the remaining capacity of the entire MD. It contains the collected data of actual resource availability for all consumable resources defined in the NSI-D for the operational NSSIs as well as idle capacity and collected data of the actual resource utilization for all consumable resources defined in the NSI-D for the operational NSSs. |

Table 1: In- and output description of the NSI-FC according to some example embodiments of the invention An example embodiment of the Resource Feasibility Checker Service and the Confidence and Risk Evaluation Service is given below.

Resource Feasibility Checker Service

One way of doing a resource feasibility check for a set of network slices to be embedded into an end-to-end mobile network is modelling the substrate (mobile network) as well as the network slices in form of undirected graphs. The elements (for instance data connections and services, functions and applications) are mapped on suitable elements of the substrate network. This can be done with an adapted version of the so called VNE (Virtual Network Embedding), especially including latency requirements and considering that UEs already have a fixed location in the substrate network.

A potential model may look similar to the following. It may be solved with an out-of-the-box Integer Linear Program solver, like the GLPK (https://www.gnu.org/software/glpk/) or the SCIP (https://scip.zib.de).

a) Definitions and Notation

An undirected graph G, defined as an ordered pair G=(V, ε) will be used to model the substrate network, i.e. the physical network infrastructure, as well as the virtual networks, i.e. the network slices. A graph is defined by a set of $n \in \mathbb{N}$ vertices $V=\{v_1, v_2, \ldots, v_n\}$ that are interconnected by a set of $m \in \mathbb{N}$ edges. Every edge $e_{ij}$ has exactly two ends, one so called start-node $v_i$ and one so called end-node $v_j$, for $i,j=1, \ldots, n$. Therefore, $e_{ij}$ can be written as $e_{ij}:=\{v_i, v_j\}$ or shorter as $e_{ij}:=v_iv_j$. Since the graphs are undirected, we have $e_{ij}=e_{ji}$.

Based on that, we define $N=(\mathcal{U}, \mathcal{C}, \varepsilon)$ as a network graph, which is an undirected Graph with a set of vertices $V:=\mathcal{U} \cup \mathcal{C}$, consisting of the UEs $\mathcal{U}:=\{u_1, \ldots, u_n\}$ with $n \in \mathbb{N}$ and the cloud server nodes $\mathcal{C}:=\{c_1, \ldots, c_m\}$ with $m \in \mathbb{N}$. The edges can start either in an UE node or in a cloud node, but always end in a cloud node: $\varepsilon \subseteq \{u_ic_j, c_kc_l\}$ for all $i=1, \ldots, n$ as well as for all $j,k,l=1, \ldots, m$ with $k \neq l$.

A path $P=v_1v_2v_3 \ldots v_n$ of length $n \in \mathbb{N}$ shall be defined as an undirected graph $P(V, \varepsilon)$ with successively connected, pairwise different vertices $V=\{v_1, v_2, \ldots, v_n\}$ connected by the set of edges $\varepsilon=\{v_1v_2, v_2v_3, \ldots, v_{n-1}v_n\}$.

The so-called start vertex of P is $v_1$, while the so-called end-vertex is $v_n$. The set of paths, sharing the same start-vertex $v_i$ and the same end-vertex $v_j$, with $i \neq j$, shall be denoted as $\mathcal{P}_{ij}$. Paths in network graphs $P_r \in \mathcal{P}_{nw}$ can start either in an UE or cloud node $d_v \in \mathcal{U} \cup \mathcal{C}$, but must end in a cloud node $c_w \in \mathcal{C}$.

b) Model Parameters and Variables

The NSE model defines a network graph $N=(\mathcal{U}, \mathcal{C}, \varepsilon)$ for the physical network infrastructure or substrate, with the UEs $u_v \in \mathcal{U}$, the cloud servers $c_w \in \mathcal{C}$ and the wired and wireless communication links $c_w \in \mathcal{C}$, also referred to as edges in the following. $n \in \mathbb{N}$ virtual networks, in this case NSLs shall be embedded into N. Whereas each NSL is modeled as an undirected graph $N_k=(\mathcal{U}_k, \mathcal{A}_k, \mathcal{L}_k)$ for $k=1, \ldots, n$. The set of UEs associated with a network slice is always a subset of the UEs in the physical network: $\mathcal{U}_k \subseteq \mathcal{U}$. Each NSL has it's on distinct set of applications $a_m^k \in \mathcal{A}_k$ and virtual communication links $l_i^k \in \mathcal{L}_k$. Since NSLs are isolated, they do not share applications and links.

The embedding is aiming at an optimal embedding of virtual applications $a_m^k$ on physical cloud nodes $c_w$ and virtual link $l_i^k$ to physical path mapping, with a fixed, i.e. already embedded set of UEs. This mapping is subject to numerous quality of service constraints, based on, for instance, the throughput and reliability of the communication links and the computation power and memory of the cloud nodes. The expected available throughput of an edge $e_j$ in the substrate is represented by a normal distribution with mean $\mu_{T_j^s}$ and the standard deviation $\sigma_{T_j^s}$. (Other probability distributions can be used instead of the normal distribution too.) For simplicity of this description, the uplink and downlink data traffic are combined to one throughput parameter in this model. The probability distribution accounts for fluctuations in the signal quality, which results in varying available throughput. For example, the SNR and therefore the channel quality as well as the actual throughput in the RAN highly depends on, e.g., the distance and obstacles between the UE and the antenna as well as weather conditions and interferences. The link latency $L_j^s$ of $e_j$ is assumed to be constant in this simplified model. However, in practice the link latency only remains constant as long as the link throughput capacity is not exceeded and a congestion in data traffic causes an additional delay. Furthermore, the cloud server $c_w \in \mathcal{C}$ in the substrate have a constant computation power $P_w^s$ and memory capacity $M_w^s$. The NSLs require a specific maximum Latency $L_i^k$ for each communication link $l_i^k$. The required throughput, however is uncertain and therefore modeled as a normal distribution $$N(\mu_{T_i^k}, \sigma_{T_i^k}),$$

for each link $l_i^k \in \mathcal{L}_k$. Note that a standard-deviation of 0 represents the special case of resource certainty. Also, the required computation power and the memory capacity for the application are defined as normal distributions: $\mathcal{N}(\mu_{P_m^k}, \sigma_{P_m^k})$ and $\mathcal{N}(\mu_{M_m^k}, \sigma_{M_m^k})$.

The following binary and continuous embedding variables are defined for the NSE optimization problem:

$$y_k := \begin{cases} 1 & \text{if } N_k \text{ is embedded into } N_s \\ 0 & \text{otherwise} \end{cases}$$

$$a2c_{mw}^k := \begin{cases} 1 & \text{if } a_m^k \text{ is mapped on } c_w \\ 0 & \text{otherwise} \end{cases}$$

$l2p_{ir}^k \in (0,1)$ percentage of data transfer of $l_i^k$ mapped on $P_r \in \mathcal{P}_{vw}$ $$p2e_{rj} := \begin{cases} 1 & \text{if } e_j \text{ is used in } P_r \\ 0 & \text{otherwise} \end{cases}$$

$$l2e_{ij}^k := \sum_r (l2p_{ir}^k \cdot p2e_{rj})$$

For a given substrate the $p2e_{rj}$ mapping is known and not subject to optimization. The $l2e_{ij}^k$ mapping results from the $l2p_{ir}^k$ mapping combined with the $l2p_{ir}^k$ mapping. Representing the problem as far as possible by binary variables is desirable regarding runtime-efficiency. The continuous variables are used to enable path splitting. (Path splitting refers to a mapping, where one virtual link is embedded on several physical edges, providing 100% of the required resources, when combined.)

c) Objective Function

In order to maintain a linear program, that can be efficiently solved nearly optimally. The uncertainty in the resource availability and utilization will be considered only in the objective function. While the linear constraints of the NSE optimization problem use the expected values for the resource availability and utilization, the objective function makes sure that: as many network slices are embedded as possible, the most beneficial ones are selected if there are not enough resource and the allocation minimizes uncertainty.

This is achieved by maximizing the following objective function:

$$\max \rho_1 \cdot f_1((y_k)) + \rho_2 \cdot f_2((l2e_{ij}^k)) + \rho_3 \cdot f_3((a2c_{mw}^k)) + \rho_4 \cdot f_4((a2c_{mw}^k))$$

The weights $\rho_1, \rho_2, \rho_3, \rho_4 \in [0,1]$, associated to the four sub-functions, sum up to one.

$$f_1((y_k)) := \sum_k \frac{\omega_k}{\beta_1} \cdot y_k$$

$$f_2((l2e_{ij}^k)) := -\sum_{k,i,j} l2e_{ij}^k \cdot \frac{\mu_{T_i^k} + \sigma_{T_i^k}\alpha_1}{\max(\mu_{T_j^s} - \sigma_{T_j^s}\alpha_1, \epsilon)\beta_2}$$

$\epsilon > 0$ shall be defined as a very small positive double value.

$$f_3((a2c_{mw}^k)) := -\sum_{k,m,w} a2c_{mw}^k \cdot \frac{\mu_{P_m^k} + \sigma_{P_m^k}\alpha_2}{P_w^s \cdot \beta_3}$$

$$f_4((a2c_{mw}^k)) := -\sum_{k,m,w} a2c_{mw}^k \cdot \frac{\mu_{M_m^k} + \sigma_{M_m^k}\alpha_3}{M_w^s \beta_4}$$

d) Linear Constraints

The above robust NSE objective function is subject to the following constraints. Eq. 1 specifies the map-once constraints, which states that every application must be mapped exactly once, if the corresponding NSL has been embedded. The graph constraints in eq. 2 to eq. 4 make sure that the physical paths and cloud nodes the virtual links and applications are mapped to are connected accordingly. The eq. 5 to eq. 7 model the resource availability constraints using the expected (mean) available resources and resource utilization. The eq. 8 models the latency.

$$\sum_w a2c_{mw}^k = y_k, \forall k, m \quad (1)$$

$$\sum_{P_r \in \mathcal{P}_{vw}} l2p_{ir}^k = y_k, \forall k, i \text{ with } l_i^k = \{u_v, a_m^k\} \quad (2)$$

$$\sum_{P_r \in \mathcal{P}_{vw}} l2p_{ir}^k = a2c_{bv}^k, \forall k, i \text{ with} \quad (3)$$

$$\sum_{P_r \in \mathcal{P}_{vw}} l2p_{ir}^k = a2c_{mv}^k, \forall k, i \text{ with } l_i^k = \{f_v^k, a_m^k\} \text{ and } f_v^k \in \mathcal{U}_k \cup \mathcal{A}_k \quad (4)$$

$$\sum_k \sum_m l2e_{ij}^k \cdot \mu_{T_i^k} \leq \mu_{T_j^s}, \forall j \quad (5)$$

$$\sum_k \sum_m a2c_{mw}^k \cdot \mu_{P_m^k} \leq P_w^s, \forall w \quad (6)$$

-continued $$\sum_k \sum_m a2c_{mw}^k \cdot \mu_{M_m^k} \le M_w^s, \forall w \quad (7)$$

$$\sum_j l2e_{ij}^k \cdot L_j^s \le L_i^k \cdot l2p_{ir}^k, \forall k, i, P_r \in \mathcal{P} \quad (8)$$

6.4.2 Confidence and Risk Evaluation Service

The model as described above may be used to determine a nearly optimal network slice embedding using the most stable network resources. To provide a beneficial solution, the expected resource demand and provisioning are used instead of the worst-case demand and availability. This may lead to a resource overbooking and resource availability violations can occur. The probability of meeting the resource constraints and the according risk of SLA violation can be evaluated as follows:

The provisioning of an uncertain resource R is normal distributed with $\mathcal{N}(\mu_R, \sigma_R)$, while it is used by several NSLs, with normal distributed uncertain demands $\mathcal{N}(\mu_{D_1}, \sigma_{D_1})$, $\mathcal{N}(\mu_{D_2}, \sigma_{D_2})$, ..., $\mathcal{N}(\mu_{D_n}, \sigma_{D_n})$. Then the overall demand for R is normal distributed with $\mathcal{N}(\Sigma_i^n \mu_{D_i}, \Sigma_i^n \sigma_{D_i})$ and the residual resources of R are also normal distributed with $\mathcal{N}(\mu_R - \Sigma_i^n \mu_{D_i}, \sigma_R + \Sigma_i^n \sigma_{D_i})$.

Thus, the PoF for meeting the constraint requirements for R, for the embedded network slices is $$PoF_R := \int_0^\infty \mathcal{N}\left(\mu_R - \sum_i^n \mu_{D_i}, \sigma_R + \sum_i^n \sigma_{D_i}\right)$$

The PoF of a network slice resource constraint is calculated for each resource, as well as for each communication link and node of the requested network slice. For instance, the required throughput of a network slice link $l_i^k$ has been assumed to be normal distributed with a mean $\mu_{T_i^k}$ and a standard deviation of $\sigma_{T_i^k}$. The mapping algorithm determines an $l2e_{ij}^k \in (0,1)$, if path-splitting is enabled, for each edge $e_j$ in the substrate network. The expected (mean) throughput utilization for $l_i^k$ is scaled with the proportion of usage $l2e_{ij}^k$ before considered in calculating the residual throughput resource availability:

$$PoF_{T_i^k} := \int_0^\infty \mathcal{N}\left(\mu_{T_j^s} - \sum_{k,i} l2e_{i,j}^k \cdot \mu_{T_i^k}, \sigma_{T_j^s} + \sum_{k,i} \sigma_{T_i^k}\right)$$

Since the computing power and the memory provided by the cloud servers are certain, but the resource demands can deviate from the expectations, the PoF for those resource is defined as follows:

$$PoF_{P_m^k} := \int_0^\infty \mathcal{N}\left(P_w^s - \sum_{k,m} a2c_{mw}^k \cdot \mu_{P_m^k}, \sum_{k,m} \sigma_{P_m^k}\right)$$

$$PoF_{M_m^k} := \int_0^\infty \mathcal{N}\left(M_w^s - \sum_{k,m} a2c_{mw}^k \cdot \mu_{M_m^k}, \sum_{k,m} \sigma_{M_m^k}\right)$$

Thus, the $PoF_T$ is calculated for each virtual link $l_i^k$ in every network slice. Furthermore, the $PoF_P$ and $PoF_M$ is determined for every application node $a_m^k$ in every network slice.

In order to evaluate the confidence in meeting the requirements of a network slice a box-plot for the PoF is created for each network slice as well as the overall confidence. Since stochastic independence of the PoF is assumed we can estimate the NSL confidence as:

$$PoF_k := \Pi_i PoF_{T_i^k} \cdot \Pi_m PoF_{P_m^k} \cdot \Pi_m PoF_{M_m^k}$$

Figure 7:
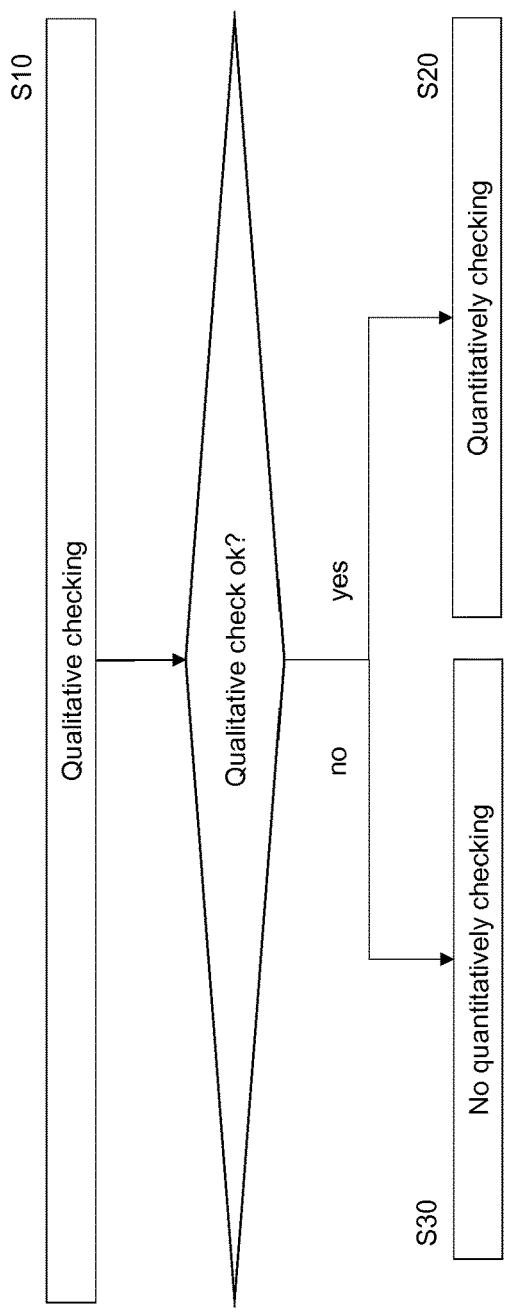
FIG. 7 shows a method according to an example embodiment of the invention.
Figure 6:
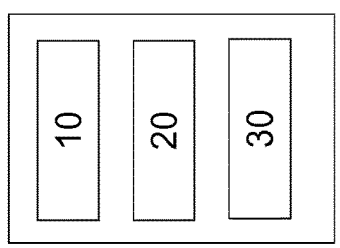
FIG. 6 shows an apparatus according to an example embodiment of the invention.

FIG. 6 shows an apparatus according to an example embodiment of the invention. The apparatus may be a feasibility checker (e.g. a NSI-FC) or an element thereof. FIG. 7 shows a method according to an example embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for qualitatively checking 10, means for quantitatively checking 20, and means for inhibiting 30. The means for qualitatively checking 10, means for quantitatively checking 20, and means for inhibiting 30 may be a qualitatively checking means, quantitatively checking means, and inhibiting means, respectively. The means for qualitatively checking 10, means for quantitatively checking 20, and means for inhibiting 30 may be a qualitatively checker, quantitatively checker, and inhibiter, respectively. The means for qualitatively checking 10, means for quantitatively checking 20, and means for inhibiting 30 may be a qualitatively checking processor, quantitatively checking processor, and inhibiting processor, respectively.

The means for qualitatively checking 10 checks qualitatively if an infrastructure provides all features required to fulfill a request to set up a network slice instance (S10).

The means for quantitatively checking 20 checks quantitatively if an available capacity of the infrastructure is sufficient to fulfill the request to set up the network slice instance (S20).

If, according to the qualitative checking by the means for qualitative checking 10, the infrastructure does not provide all the features required to fulfill the request to set up the network slice instance (S10=no), the means for inhibiting 30 inhibits (S30) the means for quantitatively checking 20 from the quantitative checking (S20).

Figure 9:
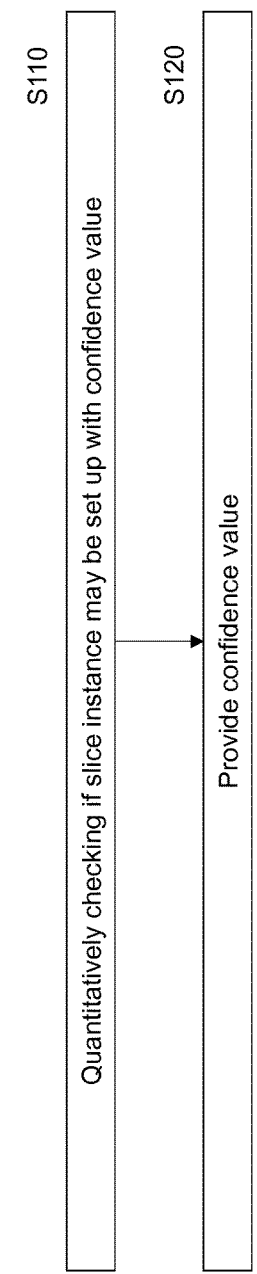
FIG. 9 shows a method according to an example embodiment of the invention.
Figure 8:
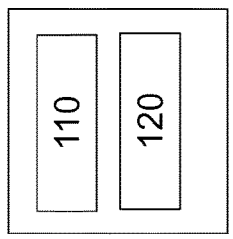
FIG. 8 shows an apparatus according to an example embodiment of the invention.

FIG. 8 shows an apparatus according to an example embodiment of the invention. The apparatus may be a feasibility checker (e.g. a NSI-FC) or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for quantitatively checking 110 and means for providing 120. The means for quantitatively checking 110 and means for providing 120 may be a quantitatively checking means and providing means, respectively. The means for quantitatively checking 110 and means for providing 120 may be a quantitatively checker and provider, respectively. The means for quantitatively checking 110 and means for providing 120 may be a quantitatively checking processor and providing processor, respectively.

The means for quantitatively checking 110 checks quantitatively if an available capacity of an infrastructure is sufficient to fulfill a request to set up a network slice instance and calculates a confidence value of a result of the checking (S110).

The means for providing 120 provides the confidence value (S120).

Figure 11:
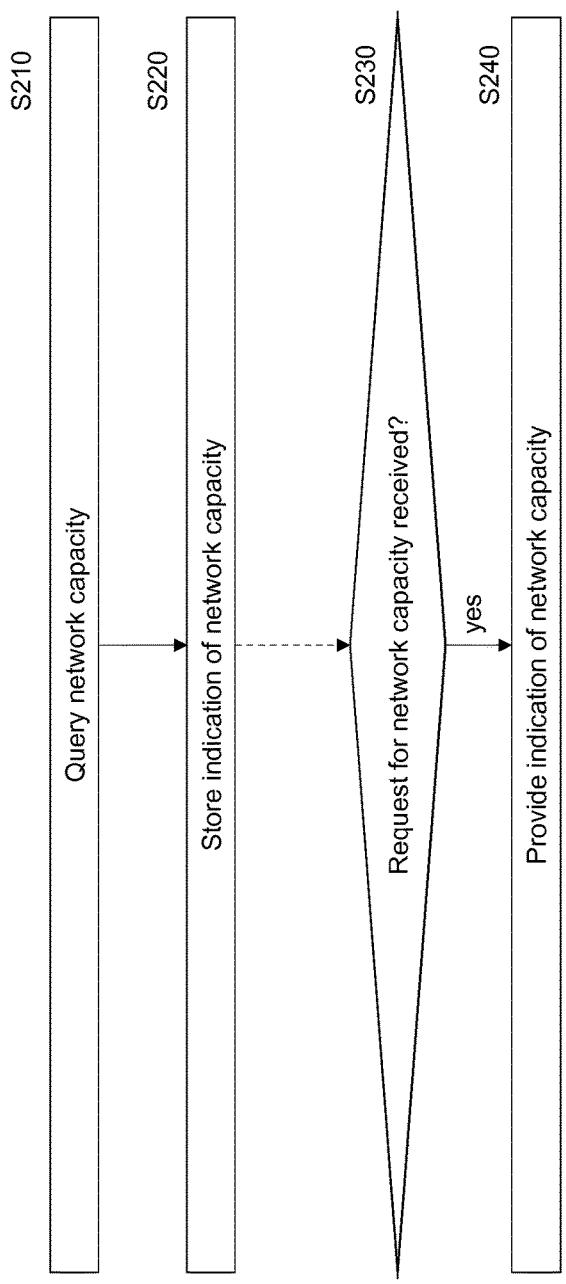
FIG. 11 shows a method according to an example embodiment of the invention.
Figure 10:
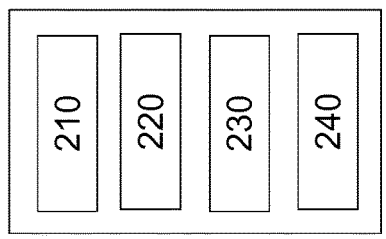
FIG. 10 shows an apparatus according to an example embodiment of the invention.

FIG. 10 shows an apparatus according to an example embodiment of the invention. The apparatus may be a feasibility checker (e.g. NSI-FC) or an element thereof (in particular: a network capability provisioning checker). FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for querying 210, means for storing 220, means for monitoring 230, and means for responding 240. The means for querying 210, means for storing 220, means for monitoring 230, and means for responding 240 may be a querying means, storing means, monitoring means, and responding means, respectively. The means for querying 210, means for storing 220, means for monitoring 230, and means for responding 240 may be a questor, memory, monitor, and responder, respectively. The means for querying 210, means for storing 220, means for monitoring 230, and means for responding 240 may be a querying processor, memory, monitoring processor, and responding processor, respectively.

The means for querying 210 queries a network capacity (e.g. an overall network capacity and/or a utilized network capacity) of a network from the network (S210). The means for storing 220 stores an indication of the network capacity received in response to the querying (S220). S210 and S220 may be repeated, e.g. periodically and/or due to specific events.

The means for monitoring 230 monitors if a request to provide an indication of the network capacity is received (S230). If the request is received (S230=yes), the means for responding 240 responds to the request by providing the stored indication of the network capacity (S240). The means for querying 210 may not query the network due to the received request. That is, S210 and S220 may be performed independent from 230 and S240. This is indicated by the dashed arrow in FIG. 11.

Figure 12:
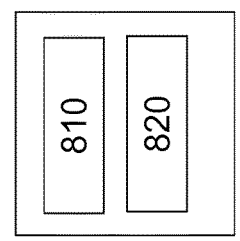
FIG. 12 shows an apparatus according to an example embodiment of the invention.

FIG. 12 shows an apparatus according to an example embodiment of the invention. The apparatus comprises at least one processor 810 and at least one memory 820 including computer program code, and the at least one processor 810, with the at least one memory 820 and the computer program code, being arranged to cause the apparatus to at least perform at least one of the methods according to FIGS. 7, 9, and 11 and related description.

According to some example embodiments of the invention, the Available Network Resource Estimation Service queries the Network Capability Provisioning Service and the NSI Requirement Provisioning Service on a regular basis (e.g. periodically). However, the invention is not limited thereto. In some example embodiments, the Available Network Resource Estimation Service queries the Network Capability Provisioning Service and the NSI Requirement Provisioning Service upon a query from the NSI-FC Provisioning Service (message 8 in FIG. 4). This Available Network Resource Estimation Service may perform the latter query instead of the queries on regular basis or in addition thereto.

Some example embodiments of the invention are described which are based on a 3GPP network. However, the invention is not limited to 3GPP networks of any generation (3G, 4G, 5G, etc.). It may be applied to other wireless and wireline networks applying slicing, too.

The definitions indicated in the present description are based on the current 3GPP standards. However, they do not limit the invention. Other definitions according to the same or a corresponding concept are applicable to some example embodiments of the invention, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a feasibility checker, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. An apparatus, comprising:
at least one processor; and
at least one memory including computer program code, said at least one memory and computer program code being configured, with the at least one processor, to cause the apparatus to:
check qualitatively if an infrastructure provides all features required to fulfill a request to set up a network slice instance;
check quantitatively if an available capacity of the infrastructure is sufficient to fulfill the request to set up the network slice instance; and
inhibit the quantitative checking if, according to the qualitative checking, the infrastructure does not provide all the features required to fulfill the request to set up the network slice instance.

2. The apparatus according to claim 1, wherein the at least one memory and computer program code are further configured, with the at least one processor, to check quantitatively if the available capacity of the infrastructure is sufficient to fulfill the request to set up the network slice instance based on a probabilistic model of usage of resources of the infrastructure.

3. The apparatus according to claim 2, wherein the probabilistic model uses data on the historical usage of the resources.

4. The apparatus according to claim 1, wherein the at least one memory and computer program code are further configured, with the at least one processor, to cause the apparatus to provide a confidence value specifying a confidence of the result of the quantitative checking.

5. The apparatus according to claim 1, wherein the at least one memory and computer program code are further configured, with the at least one processor, to cause the apparatus to:

respond to the request based on the result of the qualitative checking if, according to the qualitative checking, the infrastructure does not provide all the features required to fulfill the request to set up the network slice instance; and respond to the request based on the result of the quantitative checking if, according to the qualitative checking, the infrastructure provides all the features required to fulfill the request to set up the network slice instance.

6. An apparatus, comprising:
at least one processor; and
at least one memory including computer program code, said at least one memory and computer program code being configured, with the at least one processor, to cause the apparatus to:
check quantitatively if an available capacity of an infrastructure is sufficient to fulfill a request to set up a network slice instance and for calculating a confidence value of a result of the checking; and
provide a confidence value specifying a confidence of the result of the quantitative checking.

7. The apparatus according to claim 6, wherein the at least one memory and computer program code are further configured, with the at least one processor, to cause the apparatus to check quantitatively if the available capacity is sufficient to fulfill the request to set up the network slice instance and to calculate the confidence value of the result of the checking based on a probabilistic model of usage of resources of the infrastructure.

8. The apparatus according to claim 7, wherein the probabilistic model uses data on the historical usage of the resources.

9. The apparatus according to any claim 6, wherein the at least one memory and computer program code are further configured, with the at least one processor, to cause the apparatus to check qualitatively, prior to the quantitatively checking, if an infrastructure provides all features required to fulfill a request to set up a network slice instance.

10. An apparatus, comprising:
at least one processor; and
at least one memory including computer program code, said at least one memory and computer program code being configured, with the at least one processor, to cause the apparatus to:
query a network capacity of a network from the network;
store an indication of the network capacity received in response to the querying;
monitor if a request to provide an indication of the network capacity is received; and
respond to the request by providing the stored indication of the network capacity if the request is received.

11. The apparatus according to claim 10, wherein the network capacity is at least one of an overall network capacity of the network and a utilized network capacity of the network.

12. The apparatus according to claim 10, wherein the at least one memory and computer program code are further configured, with the at least one processor, to cause the apparatus to query periodically.

13. The apparatus according to claim 10, wherein the at least one memory and computer program code are further configured, with the at least one processor, to cause the apparatus to inhibit the querying due to the received request.

* * * * *